United States Patent
Fling et al.

(10) Patent No.: US 8,164,338 B2
(45) Date of Patent: Apr. 24, 2012

(54) LOCALIZATION SYSTEM FOR AN EARTHMOVING MACHINE

(75) Inventors: Richard Fling, Barton-under-Needwood (GB); Simon Branson, Whiston (GB)

(73) Assignee: Leica Geosystems AG, Heerbrugg (CH)

( * ) Notice: Subject to any disclaimer, the term of this patent is extended or adjusted under 35 U.S.C. 154(b) by 429 days.

(21) Appl. No.: 12/516,023

(22) PCT Filed: Nov. 27, 2007

(86) PCT No.: PCT/EP2007/010263
§ 371 (c)(1),
(2), (4) Date: May 22, 2009

(87) PCT Pub. No.: WO2008/064852
PCT Pub. Date: Jun. 5, 2008

(65) Prior Publication Data
US 2010/0052684 A1    Mar. 4, 2010

(30) Foreign Application Priority Data
Dec. 1, 2006 (CH) .......... 1953/06

(51) Int. Cl.
*G01V 3/08* (2006.01)
(52) U.S. Cl. .......... 324/326
(58) Field of Classification Search .......... 324/326
See application file for complete search history.

(56) References Cited

U.S. PATENT DOCUMENTS

| | | | | |
|---|---|---|---|---|
| 3,908,582 A | * | 9/1975 | Evett | 428/370 |
| 3,911,602 A | * | 10/1975 | Trevathan | 37/348 |
| 3,916,298 A | * | 10/1975 | Ulrich | 324/326 |
| 4,600,356 A | * | 7/1986 | Bridges et al. | 414/694 |
| 5,371,959 A | | 12/1994 | Ahs | |
| 5,479,729 A | | 1/1996 | Eslambolchi | |
| 5,592,092 A | * | 1/1997 | Mechler | 324/326 |
| 5,649,600 A | * | 7/1997 | Marsh | 172/4.5 |
| 6,437,726 B1 | * | 8/2002 | Price | 342/22 |
| 6,633,163 B2 | | 10/2003 | Fling | |
| 2006/0244454 A1 | * | 11/2006 | Gard et al. | 324/326 |
| 2006/0265914 A1 | | 11/2006 | Gudat | |

* cited by examiner

*Primary Examiner* — Bot Ledynh
(74) *Attorney, Agent, or Firm* — Maschoff Gilmore & Israelsen (57) ABSTRACT

The invention relates to a localization system for localizing an underground object for an Earthmoving machine comprising a working part. Said localization system comprises a fastening component and a detector component. The fastening component can be arranged on the working part for example by means of magnets. The detector component is adapted to detect the object using an electromagnetic field that can be associated with the object and is arranged on the fastening component so as to swing like a pendulum, thereby effecting an alignment of the detector component under the effect of gravity. Optionally, the localization system comprises an arithmetic component for deriving a distance information of the object from the detected value. The localization system also comprises a display component for displaying and/or forwarding the detected value and/or the distance information.

17 Claims, 6 Drawing Sheets

LOCALIZATION SYSTEM FOR AN EARTHMOVING MACHINE

FIELD OF THE INVENTION

The invention relates to a localization system for localizing an underground object for an earth-moving machine.

BACKGROUND

When carrying out earthworks and especially excavation work, it is necessary to know where underground objects, such as supply lines laid underground, are buried, in order to prevent damage, for example to supply lines and/or to the earth-moving machines used. Often, these objects are incompletely or wrongly documented or not documented at all. Accordingly, the terrain to be worked must be investigated before the beginning of the earthworks with respect to underground objects. The investigation is effected in general on the basis of the detection of electromagnetic fields which can be coordinated with the objects, for example by means of commercially available hand-held locating devices.

However, such scanning of terrain is too time-consuming and expensive, in particular for the working of large areas. It is therefore usual to mount localization devices or locating devices, such as cable detectors, directly on the earth-moving machine—for example an excavator—and to detect the buried objects in the course of the ongoing earthworks. In order to be very certain to avoid encountering objects during excavation, locating devices by means of which the depth of the buried objects can also be determined are advantageously used. For this purpose, locating devices are known which have two antennae arranged a distance apart along a perpendicular to the object. The distance from the object to the locating device can be derived from the field conditions detected by means of the antennae and the known fixed spacing of the antennae. Advantageously, the object data are stored and recorded, with the result that terrain documentations, such as maps, can be prepared or supplemented.

Earth-moving machines, such as, for example, excavators, are sufficiently well known from the prior art. The invention relates to earth-moving machines having a working part—in particular an excavator arm—which has an earth-moving part, such as an excavator bucket. The earth-moving part is pivotably fastened, for example, to a lower boom component of the working part. In particular, the working part has two or three members as boom components, which can be moved by means of hydraulic adjustment mechanisms.

US 2006/0265914 A1 describes a system for monitoring a predetermined limit during earth-moving work which is carried out by an earth-moving machine. For this purpose, signal-transmitting devices which determine the limit or a limit range by their position are arranged in the terrain, in particular underground. By means of a receiver device, the signals emitted by the transmitting devices are received and are transmitted to an evaluation unit, the evaluation unit deriving a position of the signal-transmitting devices from the signals received and deriving information about the limit from said position. It is proposed to fasten the receiver device on the working machine itself or alternatively to position it in a mobile manner in a separate location from the working machine, for example on a further separate vehicle.

For use for locating, for example, an underground supply line generating a magnetic field, the system disclosed in US 2006/0265914 A1 is, however, unusable since, for detection of a supply line, requirements differing from a transmitter-receiver system are necessary.

U.S. Pat. No. 6,633,163 describes an earth-moving machine having two magnetic field detectors arranged at different heights on the machine. The comparison of the detector measurements provides information about the closeness of a field generator to the earth-moving machine. With the system described, the relative position of the field generator to the earth-moving machine is determined. The determination of the distance from the field generator to the earth-moving machine or the depth of the field generator is not mentioned in said US patent. Furthermore—owing to the arrangement of the detectors directly on the machine—the system is suitable only for earth-moving machines which pull a working part behind them.

U.S. Pat. No. 5,592,092 describes two sensors mounted a distance apart on the bucket of an excavator and intended for detecting magnetic fields of underground objects. From the known distance between the sensors, the difference between the detected field magnitudes and the bucket position, the distance from the bucket to the object is derived. Since the sensors are mounted on the excavator bucket, they are, depending on the bucket position, not perpendicularly above the object. The bucket position must therefore be taken into account when determining the distance. Moreover—owing to the fixing directly on the bucket—there is the danger that the sensors would be damaged during the excavation work.

summary

An object of the invention is to provide an improved damage-stable localization system for an earth-moving machine, by means of which, when carrying out earthworks, underground objects are detectable in the terrain which is or could be worked by the respective instantaneous bearing and position of the earth-moving part.

A further object is the provision of a damage-stable localization system for an earth-moving machine, by means of which the distance to underground objects can also be determined.

These objects are achieved by the subjects of Claim 1 or of the dependent claims or the achievements are further developed.

According to the invention, a localization system for an earth-moving machine has a detector component pointing in the direction of the earth-moving part, such as an excavator bucket, and having a defined detection direction, an arithmetic component and a display component, for example for displaying or forwarding distance information. The detector component is mounted via a fastening component on a lower member of the working part—to which the earth-moving part of the machine is fastened—so that the detection direction of the detector component is aligned substantially parallel to the longitudinal direction of the lower member, which is the lower boom component of the working part. The fastening component is designed for arrangement, in particular detachable fastening, on the lower boom component of the excavator arm of the earth-moving machine. Advantageously, the fastening component can be arranged on the working part in such a way that the detector component is positioned so as to be as safe from damage as possible. As a result of the arrangement of the detector component on the lower member of the arm, the detection axis being aligned parallel to the longitudinal axis of the lower member, it follows that the detection axis and hence the defined detection direction of the detector component point to the earth-moving part and to the terrain to be worked therewith. This arrangement position also ensures that contact and collision with the earth-moving part or with the terrain itself are prevented, which otherwise might lead to damage to the detector. Thus, with an arrangement which is not very complex and is stable to damage, a localization system having a detector component is provided, which detector component detects objects in any terrain which is or could be worked at the instantaneous bearing and position of the earth-moving part by the latter. Scanning of the terrain to be worked as a separate operation before the working of the terrain is not necessary with the use of a localization system according to the invention.

An advantageous embodiment of the detector component is an arrangement of two antennae arranged a distance apart on an axis along the longitudinal direction of the lower member of the working part, the detection direction of the detector component being defined in the direction of the axis. Since the antennae are mounted a distance apart on the axis, the detected strengths of the magnetic field emanating from an object are of different magnitudes and different positions along the axis. On the basis of the difference between the magnetic field strengths detected by the two antennae a distance apart and the distance of the antennae relative to one another, the distance from the object to the detector component can be determined.

Electromagnetic fields which can be coordinated with the objects are, for example, magnetic fields generated by alternating currents or induced magnetic fields. Thus, supply lines laid underground, such as high-voltage and low-voltage cables, telecommunication cables and water pipes, or alternative underground objects can thus often be located on the basis of time-variable magnetic fields of the lines. The magnetic fields are generated, for example, as a result of current flows through the cables, as in the case of high-voltage or low-voltage cables operated with alternating currents. Alternatively, the fields are fields generated by means of application of electromagnetic signals to the lines or fields reflected by the lines. The application is effected via direct application to current-conducting supply cables or by means of induction of a magnetic field in the cable. A magnetic alternating field of a current-conducting supply cable can also be induced by signals from remote transmitters, such as radio signals from radio transmitters. Moreover, the fields may emanate from transmitters on or in the lines. For example, a conductor is introduced into non-conducting supply lines, such as clay pipes or plastic pipes—or the conductor is led next to the supply lines—and fed with alternating current.

The strength of the magnetic field is a measure of the distance of the source—i.e. of the line or of the transmitter—from the measuring location. For a straight conductor through which current flows, the strength of the magnetic field decreases inversely proportionally to the distance $d-B \approx k/d$; in the case of a magnetic dipole field, it decreases inversely proportionally to the third power of the distance $d-B \approx k/d^3$, where k designates a proportionality constant and B the magnitude of the magnetic field.

By means of a detector component having antennae a distance apart, as described above, a magnetic field of a source is detected at two measuring positions a distance apart, i.e. for two distances to the source. Subsequently, the ratio of the measured strengths of the fields can be calculated so that the proportionality constant cancels out. From the measured fields and the known relative distance of the antennae, the distance to the source can then be determined.

A detector component of a localization system according to the invention having three—or more—antennae permits the determination of the distance of an object with greater accuracy than a detector component having two antennae.

If the detector component has antennae for detecting the field, the antennae may represent uniaxial, biaxial or triaxial antennae, biaxial antennae being designated as x-y antennae. By means of multiaxial antennae, the field can be determined in a plurality of spatial directions so that not only the distance but also a direction vector to an object can be determined and objects can be detected independently of direction.

The detector component of the localization system according to the invention may also comprise magnetic field detectors, such as magnetometers or Hall sensors, as an alternative to the antennae.

The detector component may also be formed with a transmitter and receiver, in particular for distance measurements.

For example, the detector component is a radar, objects being detected by means of radiation emitted by a transmitting unit of the detector component and received by a receiving unit of the detector component.

Optionally, the detector component additionally comprises a laser rangefinder, a GPS system or other optical surveying systems in order to measure the distance to the—original or worked—terrain. If the distance to an object can be determined by means of the detector component, the measurement of the position of the detector component or the working part relative to the terrain can be used in order to determine the depth of the object. The working part can then be controlled according to the depth determined.

A position determination of the working part can also be carried out by alternative methods customary in machine control. For example, measuring a reflector on the working part is known. A position determination—for example of an excavator arm as the working part—by means of tilt sensors and pressure sensors is likewise known.

The localization system according to the invention is in the form of a localization system for an earth-moving machine. The earth-moving machine is in particular an excavator having an excavator arm as a working part. Usually, an excavator arm is formed from a plurality of boom components and an excavator bucket as the earth-moving part, which in each case are vertically adjustable. The boom component on which the earth-moving part is directly fastened is designated as the lower boom component. The fastening component of a localization system according to the invention is preferably mounted on the lower boom component in such a way that it is arranged as close as possible to the bucket but does not come into contact with the bucket in any position of the excavator arm.

The fastening component is, for example, in the form of a metal plate and it can be fastened magnetically on the working part. Alternatively, the fastening component may be in the form of a frame-like holder. A fastening component which is integrated in the working part and on which the detector component can be fastened is also possible. In a simple case, the fastening component consists of a rope or of clamps for fastening the detector component on the working part. A formation of the fastening component as a housing is useful, for example, for housing the arithmetic component and housing batteries or tools for mounting the fastening and/or the detector components. Likewise, the fastening component and the detector component can be arranged in a common housing.

The localization system according to the invention furthermore comprises a display component for displaying the detection of the detector component. If the detection is only the detection of an electromagnetic field, the display component can generate a warning signal on detection. The warning signal is, for example, an acoustic or optical signal for a user, such as an excavator driver. In addition or alternatively, the warning signal may be a signal for a control device of the earth-moving machine, with the result that, for example, the movement of the machine and/or of the working part thereof is stopped.

Optionally, the localization system according to the invention comprises an arithmetic component. By means of the arithmetic component, the detection of the detector component is further processed. For example, the distance to the object is derived from the detection and is optionally stored. The arithmetic component can communicate via appropriate interfaces with the display component, which then displays or forwards the information derived by means of the arithmetic component, such as distance information.

For display for a user, the display component is, for example, in the form of a graphic display and is arranged in a driver's cab. On the display, the detection can be displayed as a warning signal, for example by means of flashing or lit-up lamps. The distance information can be displayed figuratively in a terrain model, by means of indicator lamps or as numerical values. In addition or alternatively, an acoustic alarm can be provided.

The arithmetic component is, for example, a microprocessor. Furthermore, a controller may be coordinated with the arithmetic or display component.

Detector component, display component and optionally arithmetic component and optionally controller have in each case devices for communication. The devices may be cable connections or wireless interfaces, such as Bluetooth or CANBUS. For example, the components also communicate via radio signals. The communication takes place among the individual components. The communication can furthermore take place to external devices, such as a control system operated by a user, or to control devices of the earth-moving machine.

BRIEF DESCRIPTION OF THE DRAWINGS

The localization system according to the invention is described or illustrated below, purely by way of example, with reference to working examples shown schematically in the drawings. Specifically.

DETAILED DESCRIPTION

Figure 1:
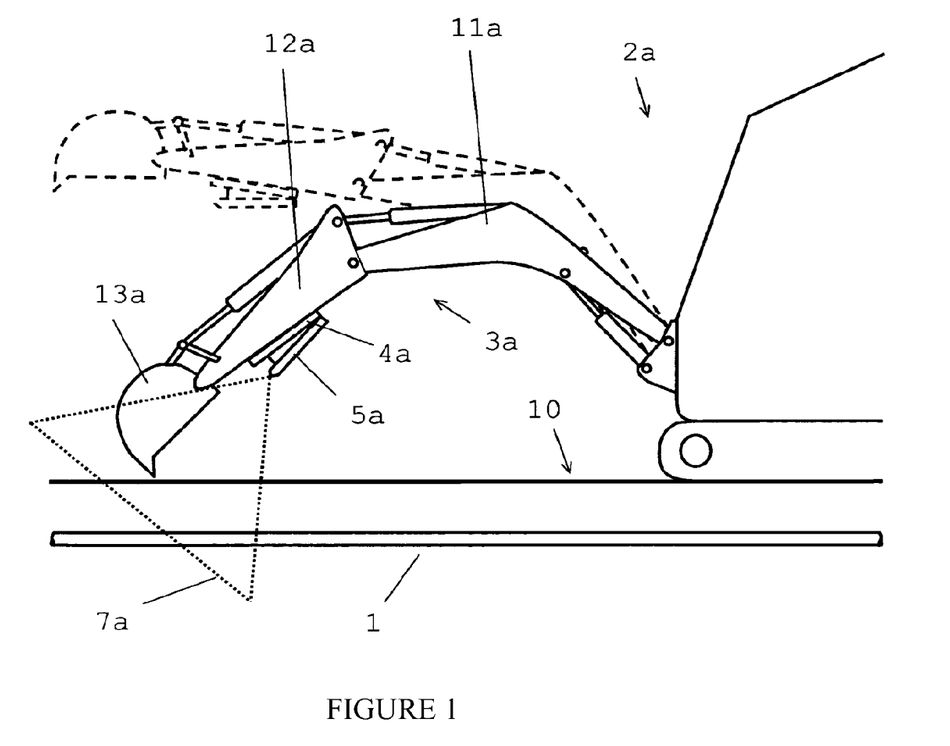
FIG. 1 shows an excavator as an earth-moving machine having a fastening and detector component arranged according to the invention.

FIG. 1 shows an excavator 2a as an earth-moving machine having a localization system according to the invention. The excavator 2a travels over a terrain 10 on which excavation work is to be carried out. The excavation work is effected, for example, as part of the construction of a road or the laying of cables or pipes. A supply line 1 has already been laid as an underground object under the terrain to be worked, an electromagnetic field emanating from the supply line 1. The excavator 2a has, as a working part, an excavator arm 3a with an upper boom component 11a, a lower boom component 12a and an excavator bucket 13a, which in each case are vertically adjustable by means of hydraulic cylinders. A fastening component 4a, which here is in the form of a housing fastened magnetically to the second boom component, and a detector component 5a are arranged as components of the localization system according to the invention on the lower boom component 12a. The detector component 5a is arranged on the fastening component 4a in such a way that the detection axis and hence the detection direction of the detector component 5a are substantially parallel to the longitudinal direction of the lower boom component 12a. Consequently, the detection direction always points in the direction of the excavator bucket 13a and in the direction of the terrain to be worked with the excavator bucket 13a. The detector component 5a is formed for the detection of electromagnetic radiation. As soon as radiation is detected, the distance of the source is calculated by means of the arithmetic component arranged in the fastening component 4a—in the form of a housing—and the information is forwarded, for example, to the display component—not shown here—or to a control device of the excavator 2a. The forwarding is effected via radio—e.g. via Bluetooth interfaces. Display component, detector component 5a and fastening component 4a could also be arranged in a common housing.

Figure 2:
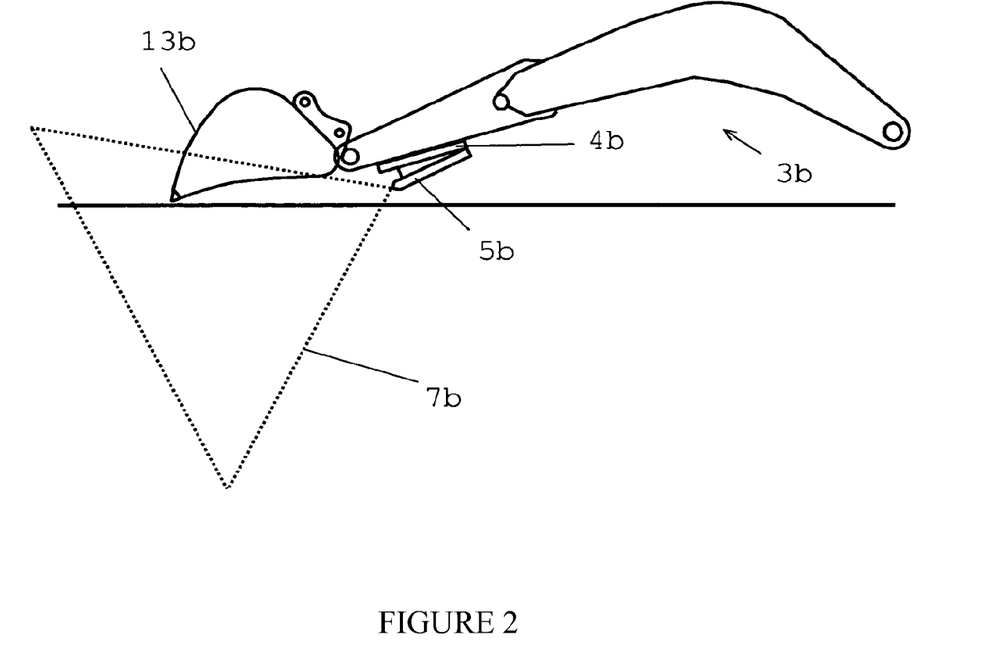
FIG. 2 shows an excavator arm which is present in a working position, with components of a localization system according to the invention.

The diagram in FIG. 2 shows an excavator arm 3b in a working position with components of a localization system. The diagram shows that the detector component 5b of the localization system is arranged in such a way that it is arranged as close as possible to the excavator bucket 13b but sufficiently far away that it does not come into contact with the bucket. The detection cone 7b within which objects can be detected is furthermore shown. The terrain which is being worked or could be worked in the instantaneous position of the excavator bucket 13b is scanned in each case.

Figure 3:
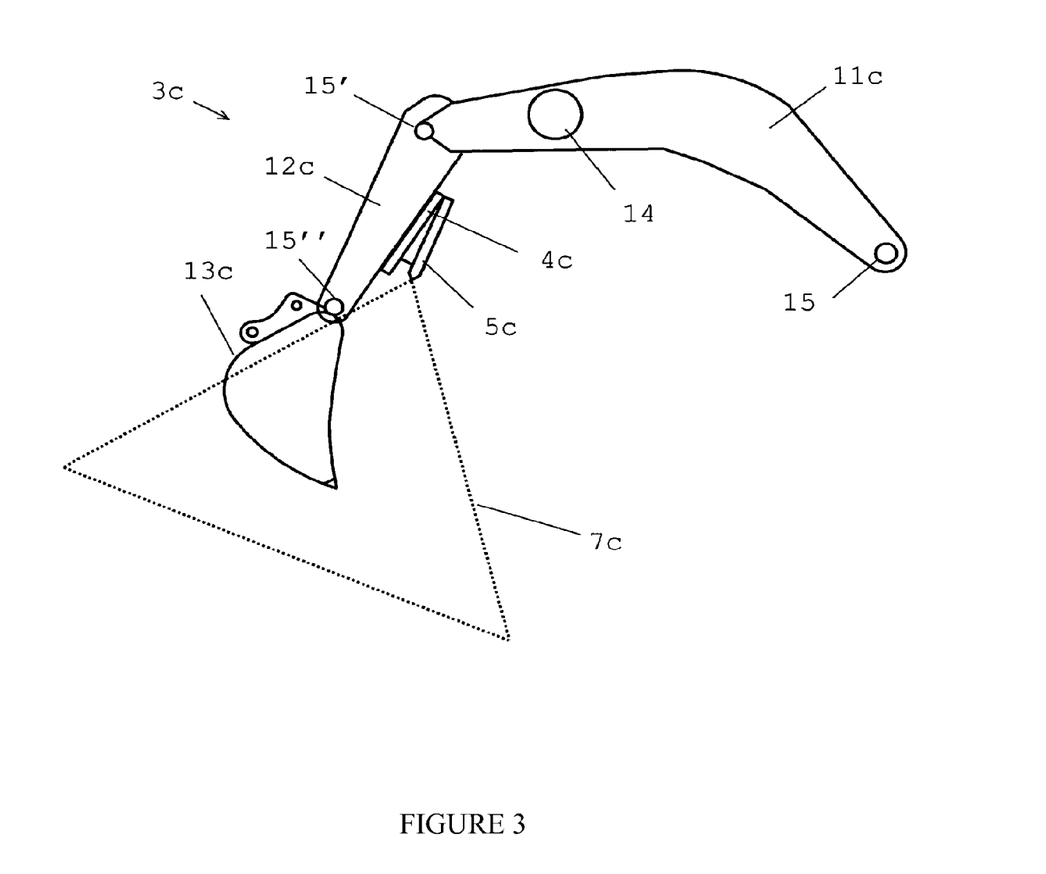
FIG. 3 shows an excavator arm which is present in a further working position, with components of a localization system according to the invention.

FIG. 3 shows an excavator arm 3c in a further working position with components of the localization system. Furthermore, a reflective element 14 is mounted. The reflective element 14 can be measured by means of a tacheometer and the position of the element thus determined. Further sensors are coordinated with the excavator arm 3c: in each case pressure sensors 15, 15', 15" are coordinated with hydraulic cylinders—not shown—for adjusting the upper boom component 11c and the lower boom component 12c of the excavator arm 3c and the excavator bucket 13c. Furthermore, in each case a tilt sensor is coordinated with the upper boom component 11d, the lower boom component 12d and the excavator bucket 13c. The tilt sensors are not shown. By means of the reflective element 14 and the sensors, the position of the lower edge of the bucket can be calculated from the position of the reflective element 14 and the tilt information on the basis of simple geometry. If the distance to an underground object is now determined via the localization system, the depth of the object can be determined with the knowledge of the position of the excavator arm 3d—and therefore of the detector component 5c which has a fixed positional relationship with the excavator arm 3c.

Figure 4:
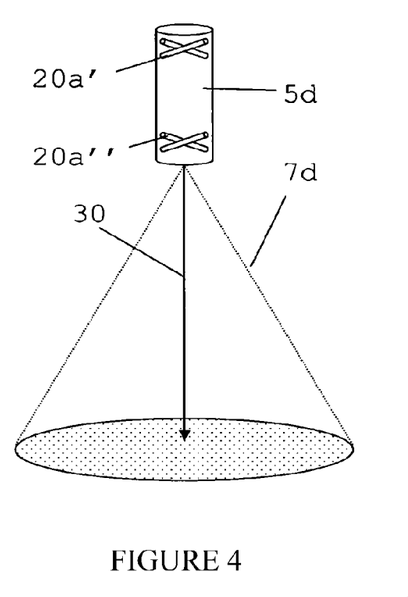
FIG. 4 shows a detector component having two x-y antennae arranged along an axis and the detection cone which follows therefrom and within which objects are detected.

FIG. 4 shows a working example of a detector component 5d according to the invention having two x-y antennae 20a' and 20a" arranged a distance apart on an axis, with the result that the detection direction 30 of the detector component 5d is defined along the axis, and the detection cone 7d within which objects are detected.

Figure 5:
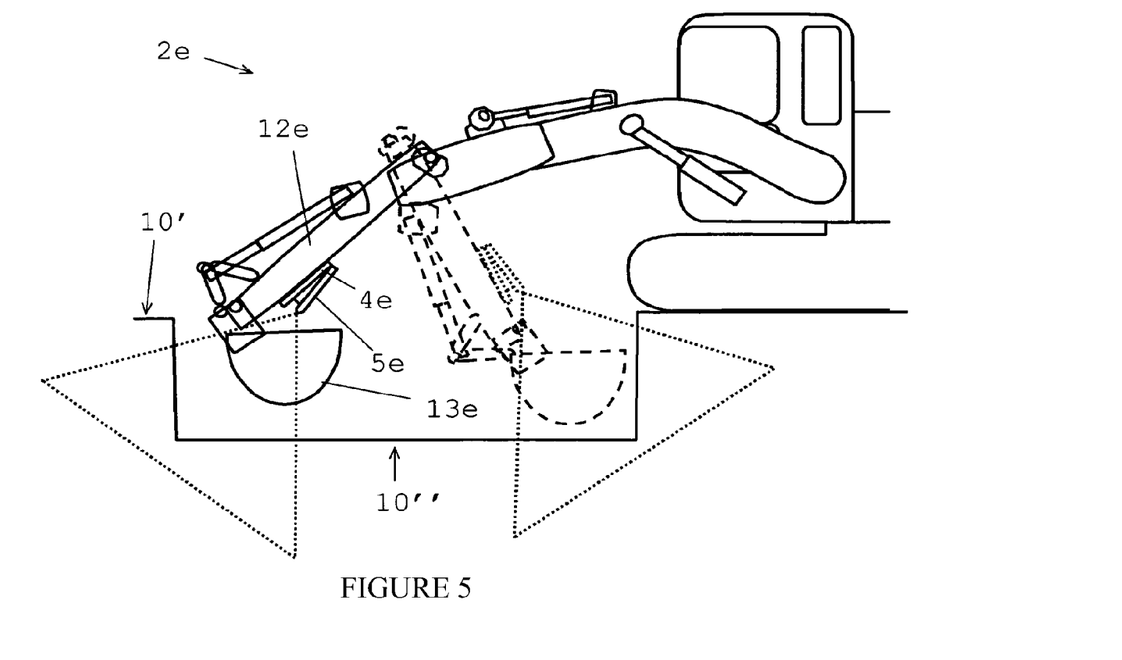
FIG. 5 shows an excavator having a fastening component, a detector component and a display component of a localization system according to the invention.

In FIG. 5, an excavation is carried out in a terrain 10' by means of the excavator 2e. The detector component 5e is arranged via the fastening component 4e on the excavator arm, on the lower boom component 12e which is connected in a rotatable manner to the bucket 13e. According to the following FIG. 7C, the detector component 5e is provided with antennae and a laser rangefinder. By measuring the distance to the terrain—in this case, for example, to the excavated terrain 10"—with the laser rangefinder, the depth of a detected object can also be determined from a distance of the object which is calculated from the detection data of the detector component 5e. The diagram shows that the arrangement of the detector component 5e via the connecting element 7e and the fastening component 4e on the boom component 12e is such that the detector component 5e does not come into contact with the bucket 13e even in an end position of said bucket—and is therefore protected from damage by the bucket 13e. During transport of the excavator—when the excavator is therefore not being actively used—the detector component 5e and optionally the further components can be simply removed, for example for protection against theft.

Figure 6:
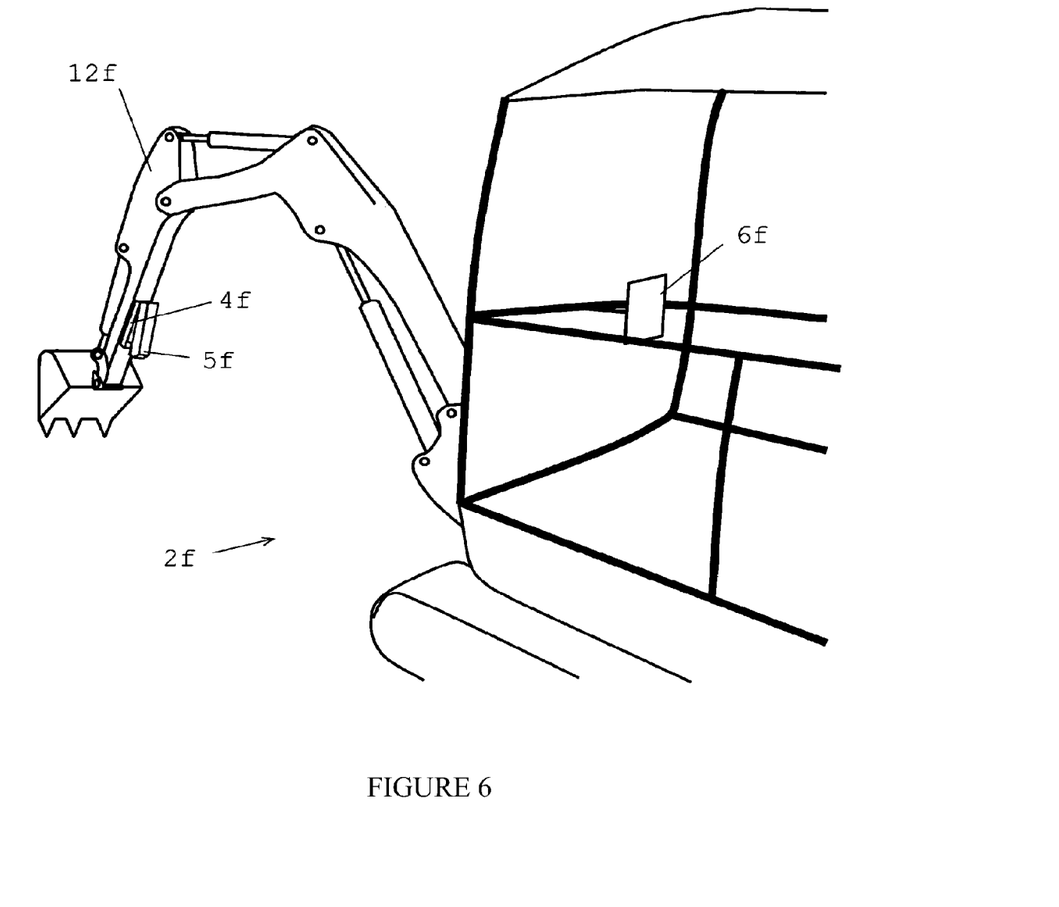
FIG. 6 shows a further working example of a localization system according to the invention.

FIG. 6 shows a working example of a localization system according to the invention having a fastening component in the form of housing 4f for the arithmetic component. The detector component 5f is arranged on the housing 4f. According to the preceding Figures, the fastening component is mounted on the lower boom component 12f of the excavator 2f. The housing 4f as a fastening component has, on the back of the housing, magnetic strips via which it is fastened magnetically to the front boom component 12f. The magnetic fastenability permits rapid and easy mounting and removal of the housing 4f. A display component 6f which comprises a graphic display is arranged in the driver's cab of the excavator 2f. The display component 6f is formed, for example, according to the working examples shown below in FIG. 8.

Figures 7A, 7B, 7C:
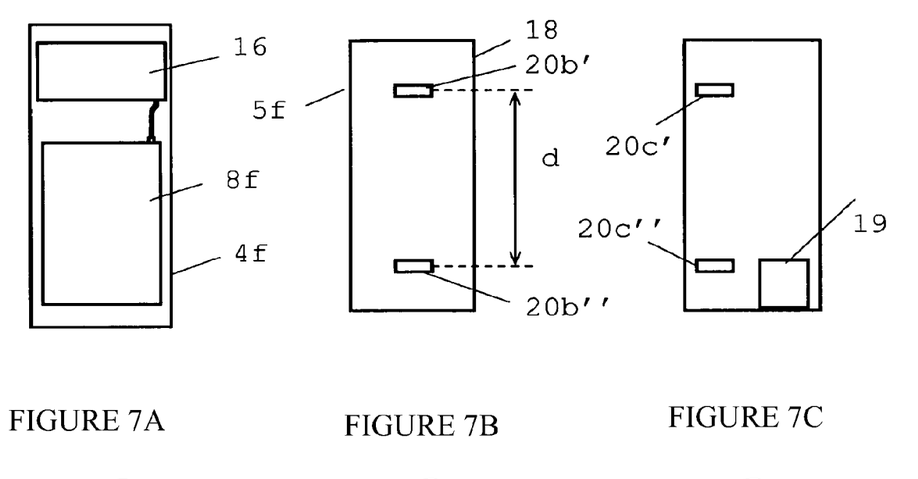
FIG. 7 shows, in four partial figures, working examples relating to components of a localization system according to the invention.

FIG. 7A shows in somewhat more detail an embodiment of the fastening component 4f which is in the form of a housing for a battery compartment 16 and an arithmetic component 8f.

Figure 7D:
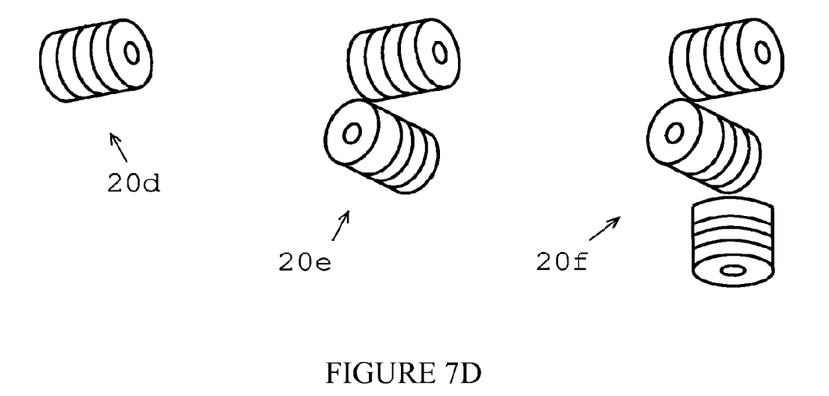

FIG. 7B shows the detector component 5F which has a first antenna 20b' and a second antenna 20b" which are arranged a known distance d apart in a housing 18. FIG. 7C shows a working example of a detector component which likewise has first and second antennae 20c', 20c", which are arranged a fixed distance apart, and additionally a laser rangefinder 19. The antennae are designed, for example, in each case with a coil or with a plurality of coils as the uniaxial antenna 20d, the x-y antenna 20e or the triaxial antenna 20f from FIG. 7D. A time-variable magnetic field of an underground conductor induces a voltage between the ends of the coil or of the coils of the antennae, which induced voltage depends on the magnitude of the magnetic field. A distance value of the conductor is derived from the antennae outputs in the arithmetic component 8f. The derivation may be, for example, simply an assignment of a distance value to the antennae outputs.

Figure 8:
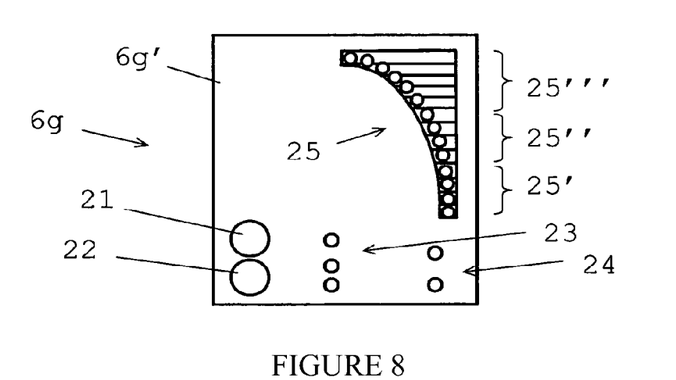
FIG. 8 shows a working example for a display component of a localization system according to the invention.

FIG. 8 shows a working example for a display component 6g of a localization system according to the invention. The display component 6g has a graphic display 6g' and is in the form of a display and control unit. A multiplicity of LEDs as visual display means and a plurality of push-button switches for selecting settings are formed on the graphic display 6g'. Here, the push-button switches comprise a "mute" push-button switch 21 for silencing an acoustic alarm, which is provided in addition to the visual alarm signals. With a further push-button switch 22, the localization system can be switched to "standby" or "active". LEDs 23 associated with the push-button switches indicate which setting is active by lighting up. Two further LEDs 24 indicate the battery level of the arithmetic component 8f and detector component 5f and of the display 6g'. The LEDs 25 in the upper region of the display 6g' are a visual display of distance information with regard to an underground object detected. They are divided into three colour sections—green, yellow, red. If the green LEDs 25' light up, an underground object has been detected which, however, is still at a distance of more than 30 cm. The lighting up of the yellow LEDs 25" indicates that the object has now assumed a distance of less than 30 cm. When the red LEDs 25'" light up, the object is less than 10 cm away and the highest alarm level prevails.

The invention claimed is:

1. A localization system for localizing an underground object for an earth-moving machine which has a working part comprising at least one lower boom component and an earth-moving part, comprising:
   a fastening component;
   a detector component arranged indirectly or directly on the fastening component and configured for detecting the object on the basis of an electromagnetic field which can be assigned to the object; and
   a display component for displaying or forwarding the detector signal and/or the evaluations of the detector signal, wherein the detector component has a defined detection direction and is arranged by means of the fastening component on the lower boom component in such a way that the detection direction is aligned substantially parallel to the longitudinal direction of the lower boom component and points in the direction of the earth-moving part.

2. A localization system according to claim 1, wherein the detector signal and/or the evaluations of the detector signal include distance information.

3. A localization system according to claim 1, wherein the underground object includes a supply line and the working part includes an excavator arm.

4. A localization system according to claim 1, further comprising an arithmetic component for evaluating the detector signal.

5. A localization system according to claim 1, further comprising an arithmetic component for deriving and storing distance information with regard to the object.

6. A localization system according to claim 1, wherein the detector component has a first antenna and second antenna for detecting the electromagnetic field, which antennae are arranged on an axis defining the detection direction, substantially parallel to the longitudinal direction of the lower boom component at a fixed distance relative to one another, in such a way that the distance from the detector component to the object can be derived from the ratio of the strengths of the field detected by means of the first antenna and second antenna.

7. A localization system according to claim 6, wherein the first and the second antenna are in the form of x-y antennae.

8. A localization system according to claim 1, wherein the fastening component and the detector component are arranged in a common housing.

9. A localization component according to claim 1, wherein the fastening component is magnetically fastenable.

10. A localization system according to claim 1, wherein the display component:
   displays the detection and/or the distance information to a user; and/or forwards the detection and/or the distance information to a control device of the earth-moving machine, for example an actuating device of the working part.

11. A localization system according to claim 1, wherein the display component:
forwards the detection and/or the distance information to an actuating device of the working part.

12. A localization system according to claim 1, wherein the display component includes a graphic display.

13. A localization system according to claim 1, wherein the display component includes:
visual display means; and/or
acoustic display means.

14. A localization system according to claim 1, wherein the display component includes light emitting diodes.

15. A localization system according to claim 1, wherein the fastening component is in the form of a housing for:
the arithmetic component; and/or
the display component.

16. A localization system according to claim 1, wherein a rangefinder is provided which is coordinated with the localization system.

17. A localization system according to claim 1, wherein a rangefinder which is coordinated with the localization system is provided and is arranged on the detector component.

* * * * *